US006328195B1

(12) United States Patent
Michalik et al.

(10) Patent No.: US 6,328,195 B1
(45) Date of Patent: Dec. 11, 2001

(54) DEVICES FOR DRIVING A GUIDE ROLLER

(75) Inventors: Horst Bernhard Michalik, Höchberg; Wolfgang Günter Ruckmann, Würzburg, both of (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 0 days.

(21) Appl. No.: 09/581,255

(22) PCT Filed: Dec. 18, 1998

(86) PCT No.: PCT/DE98/03723

§ 371 Date: Jun. 26, 2000

§ 102(e) Date: Jun. 26, 2000

(87) PCT Pub. No.: WO99/33661

PCT Pub. Date: Jul. 8, 1999

(30) Foreign Application Priority Data

Dec. 24, 1997 (DE) .......................................... 197 57 979

(51) Int. Cl.[7] .......................... B65H 20/00; G03B 1/56
(52) U.S. Cl. ........................................ 226/188; 226/92
(58) Field of Search .......................... 242/91, 92, 188

(56) References Cited

U.S. PATENT DOCUMENTS 2,862,705 * 12/1958 Faeber .............................. 226/92
2,944,345 * 7/1960 Faeber .............................. 226/92 X
3,624,875 * 12/1971 Haft .............................. 226/92 X
3,995,553 12/1976 Winterholler et al. .
4,253,246 3/1981 Marchal .
4,480,801 * 11/1984 Stone .............................. 226/92 X
5,052,295 * 10/1991 Suzuki et al. .................... 226/92 X
5,249,373 * 10/1993 Rogne et al. .................... 226/92 X
5,400,940 3/1995 Sato et al. .
5,996,873 * 12/1999 Pimpis .............................. 226/92

FOREIGN PATENT DOCUMENTS 2402768 10/1974 (DE) .
3524697 1/1987 (DE) .
3604504 1/1989 (DE) .
094631 11/1983 (EP) .

* cited by examiner

*Primary Examiner*—Michael R. Mansen
(74) *Attorney, Agent, or Firm*—Jones, Tullar & Cooper, PC

(57) ABSTRACT

A guide roller is driven in an intermittent manner. A driven draw-in mechanism is used to draw in a paper or other continuous web of material. The drive mechanism for the web guide roller is accelerated to a paper feed speed prior to the arrival of the start of the paper web at the guide rollers. A coupling is provided between the draw-in mechanism and the guide roller.

8 Claims, 5 Drawing Sheets

DEVICES FOR DRIVING A GUIDE ROLLER

FIELD OF THE INVENTION

The invention relates to devices for driving a guide roller.

DESCRIPTION OF THE PRIOR ART

A device for drawing-in a web of material by finite flexible traction means driven along the draw-in path by means of adjoining driving stations is known from DE 24 02 768 C2.

It is a limitation of the prior device here that the drawing means are subjected to great wear, since they must conduct the web of material, for example a paper web, around a number of paper guide rollers, wherein some of the paper guide rollers reverse them by up to 180° and they must be brought from a stop to the draw-in speed by the paper web. It is therefore possible in the course of the draw-in that large tensional forces act on the draw-in tip formed on the paper web, which often lead to a break in the paper web on a location between the paper web and the adhesive tip.

DE 36 04 504 C2 describes a draw-in device, wherein the guide rollers are driven by means of an auxiliary driving mechanism during the draw-in of a paper web.

EP 0 094 631 B1 shows a device for drawing-in a web of material by means of a rope. This rope drives guide rollers via a controllable coupling.

SUMMARY OF THE INVENTION

The object of the present invention is based on providing devices for driving a guide roller.

In accordance with the present invention, this object is attained by moving traction devices, which draw in the web of material, to also drive the guide roller. The guide roller is driven only intermittently during the material web drawing in.

The advantages which can be achieved by means of the invention reside in particular in that, when driving is performed by the draw-in means, no mechanical, i.e. electrical, pneumatic, hydraulic or also linear-motor drive mechanisms, for example, need to be used for accelerating guide rollers or paper guide rollers prior to the draw-in process.

In particular in connection with finite draw-in means, i.e. those having a finite length, for example a finite roller chain, the guide roller is driven only intermittently by the finite drawing means, i.e. as long as the drawing means are located in the vicinity of the guiding roller. Therefore additional controls for switching the drive mechanism of the guide roller are omitted. The guide roller is only driven when the drawing means reach the vicinity of the guide roller.

If a centrifugal force coupling is used, a gentle acceleration of the guide roller without jerking takes place with little reactive effects on the drawing means.

BRIEF DESCRIPTION OF THE DRAWINGS

Preferred embodiments of the invention are represented in the drawings and will be described in greater detail in what follows.

Shown are in.

DESCRIPTION OF THE PREFERRED EMBODIMENTS

Figure 1:
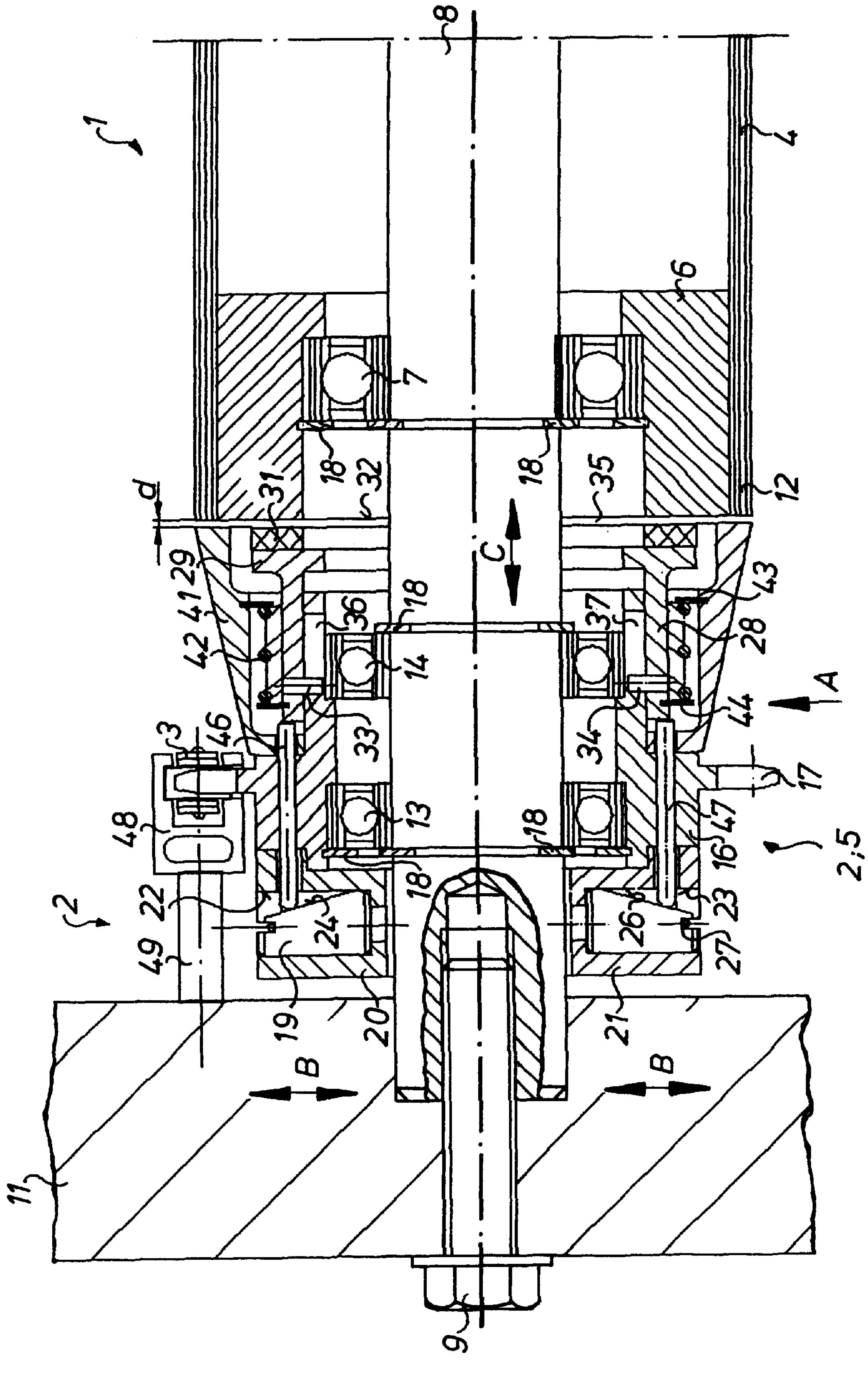
FIG. 1, a side elevation view, partly in cross-section through a first embodiment variation start-up device in accordance with the invention in the position of rest, FIG. 2, a plan view of a hub useble in the invention shown in FIGS. 1 and 3, FIG. 3, a longitudinal section through a second embodiment variation of a start-up device in the position of rest, FIG. 4, a longitudinal section through a third embodiment variation of a start-up device in the position of rest, FIG. 5, a longitudinal section through a fourth embodiment variation of a start-up device in the position of rest.

In accordance with a first preferred embodiment, a device for starting up a guide roller 1, a guide roller for a web of material, or a paper web guide roller, consists of a coupling 5, for example a centrifugal force coupling 2, which is in engagement with driven finite draw-in means, for example a roller chain 3 of a draw-in system for web of material, for example paper webs (FIG. 1). The roller chain 3 has a length of approximately 6 m, for example. The guide roller 1 consists of a roller jacket 4, which is rotatably supported on a shaft 8 at least by means of hubs or support rings 6 and bearings 7, for example deep groove ball bearings, sliding bearings or the like, located at the two ends of the roller jacket 4. The shaft 8 is connected, fixed against relative rotation, with the lateral frame 11 by fastening means, for example screws 9.

The centrifugal force coupling 2 is arranged between one end 12 of the guide roller 1 and the lateral frame 11. It consists of a sleeve-shaped hub 16, rotatably arranged on the shaft 8 by means of bearings 13, 14, for example deep groove ball bearings, sliding bearings or the like, and has a gear wheel 17, fixedly arranged on its jacket surface.

The deep groove ball bearings 7, 13, 14 are maintained in place on the shaft 8, or respectively on one shoulder of the support ring 6, or respectively the hub 16, by means of appropriately dimensioned retaining rings 18.

On the side close to the lateral frame, the hub 16 is fixedly connected with a rotatable centrifugal body carrier 20, which contains a number of centrifugal bodies 19, 21. The centrifugal bodies 19, 21, for example four, are arranged in linear guides 22, 23, so they can be moved back and forth in the radial direction B of the shaft 8.

The centrifugal bodies 19, 21 are embodied to be wedge-shaped, wherein the wedge faces 24, 25 respectively point in the direction facing away from the lateral frame. The wedge faces 24, 26 each rise in the direction toward the shaft 8. The centrifugal bodies 19, 21 are held together on the side facing away from the shaft by means of an annular spring 27, wherein the annular spring 27 is guided in a groove, of the centrifugal bodies 19, 21.

Figure 2:
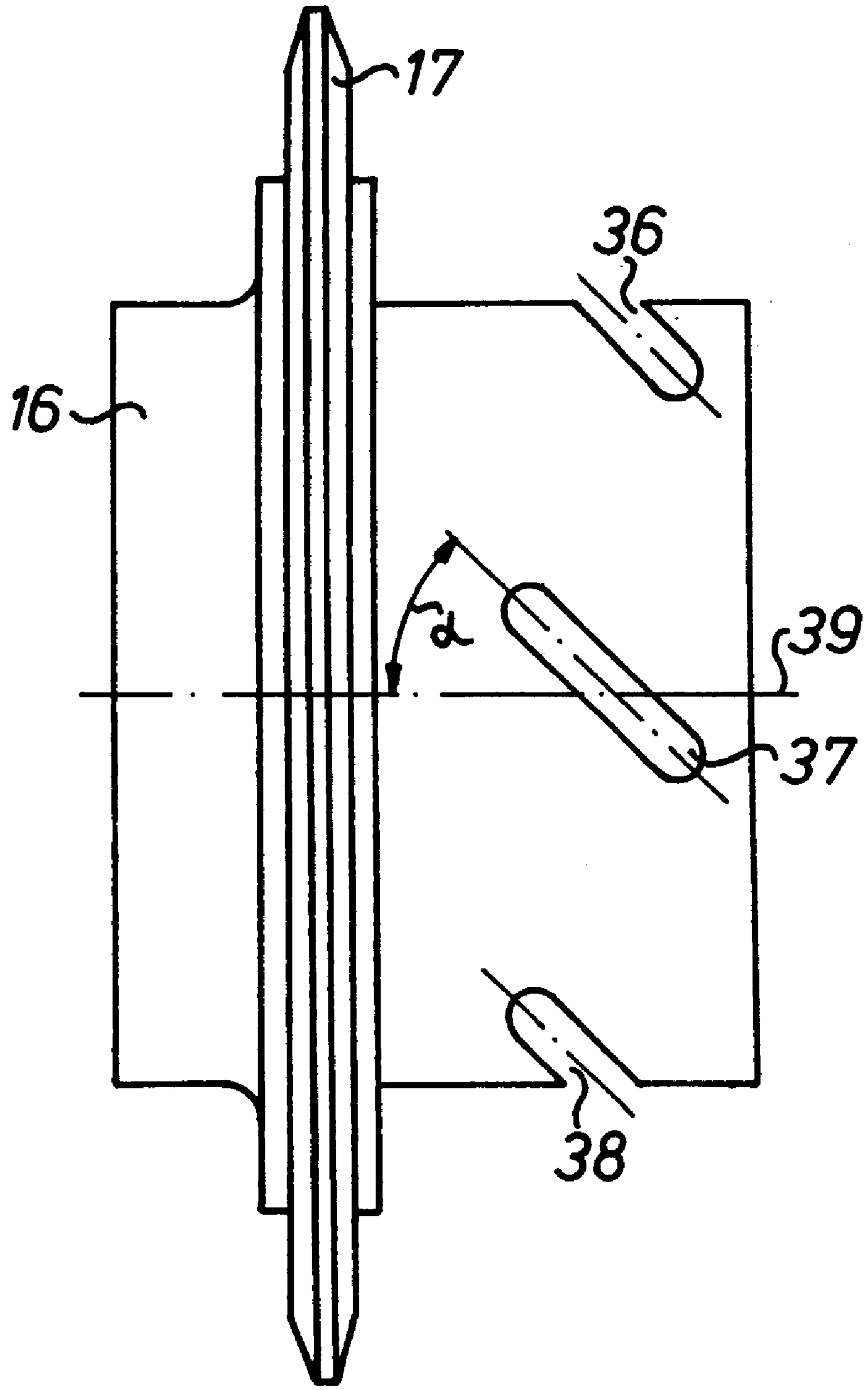

A coupling sleeve 28, which can be moved in the axial direction C and in a helical shape around the shaft 8, is arranged on the side facing away from the lateral frame. On its side near the guide roller 1, the coupling sleeve 28 has an annular flange 29, which is covered with a friction coating 31 and can be pushed against a front face 32 of the guide roller 1, or respectively the support ring 6 of the latter, constituting an opposed bearing. The coupling sleeve 28 is arranged on the hub 16 in a manner in which it can be rotated in a helical line by means of guide pins 33, 34, which are oriented in a radial direction toward the shaft 8 and engage slits 36, 37 and 38, as shown in FIG. 2, formed in hub 16. No guide pin is represented in connection with the last one one of this slits 36, 37 and 38.

The slits 36 to 38 have been cut into the hub 16 at an angle $\alpha$ of 30° to 60°, however preferably 45°, in a plane 39 extending in the radial direction in respect to the shaft 8 (FIG. 2).

In this case it is also possible to cut the slits 36, 37 into the hub 16 at an angle α of zero degrees, i.e. extending in the axial direction.

An annular housing 41, which is fixed in place on the hub and covers the coupling sleeve 28, is located between the seat of the gear wheel 17 on the hub 16 and the front face 32 of the guide roller 1. A compression spring acting as a restoring spring 42, whose extension is limited by a support ring 43 fastened on the interior of the housing, as well as by a support ring 44, fastened on the circumference of the coupling sleeve, is arranged inside this housing 41 and is located coaxially on the coupling sleeve 28.

Force transmitting members, for example studs 46, 47, are arranged between the wedge faces 24, 26 of each centrifugal body 19, 21 and the front close to the gear wheel of the coupling sleeve 28, and are seated fixed on the gear wheel support and extending axis-parallel.

The roller chain 3 is guided in a chain guide rail 48, which is fastened by means of spacers 49 on the lateral frame 11.

The start-up process of a guide roller takes place in a manner explained in what follows. The start of a drawing-in roller chain 3, which runs in the chain guide rail 48, reaches the gear wheel 17 (FIG. 1) and meshes with it. The hub 16, which is fixedly connected with the gear wheel 17, begins to rotate, because of which the centrifugal body carrier 20 also rotates. Because of the centrifugal forces being generated in the course of the rotation of the centrifugal body carrier 20, the centrifugal bodies 19, 21 are pushed radially outward in their linear guides 22, 23 against the force of the annular spring 27. The studs 46, 47 are pushed in the direction toward the guide roller 1 by the wedge effect of the centrifugal bodies 19, 21, wherein the friction coating 31 of the the coupling sleeve 28 is pushed against the front face 32 of the guide roller 1, or respectively the support ring 6, against the force of the restoring spring 42. The dimensions of the centrifugal bodies 19, 21 limit the torque which can be transmitted. Because of this, the centrifugal force coupling can therefore be designed so that the amount of torque can be set in that the prestress of the restoring spring 42 is made adjustable by means of a change of the spring travel.

A gap 35 located between the friction coating 31 and the front face 32 and having a gap width d of, for example 2 millimeters, is closed. Because of this the guide roller 1 is slowly brought to a circumferential speed which corresponds to the speed of passage of the roller chain 3. In case of an inclined extension of the slits, for example the angle α equals 45°, the front face should be spring-supported. The circumferential speed of the guide roller 1 is a function of the reference diameter of the gear wheel 17. The reference diameter can correspond to the diameter of the guide roller 1 or can be less or greater than it.

In this way the guide roller 1 has been brought to a speed which is close to the draw-in speed of the roller chain 3. It is assured by this that, upon arrival of the paper web start, the guide roller 1 has been accelerated close to the draw-in speed.

At the end of the passage of the roller chain 3, the gear wheel 17 is no longer driven, so that the centrifugal bodies 19, 21 are pushed back into their initial position by the force of the annular spring 27. The coupling sleeve 28 is simultaneously returned by the pressure force of the restoring spring 42, so that the gap 35 of a gap width d is again created.

Now the guide roller 1 is driven by the frictional effect of the running paper web.

Figure 3:
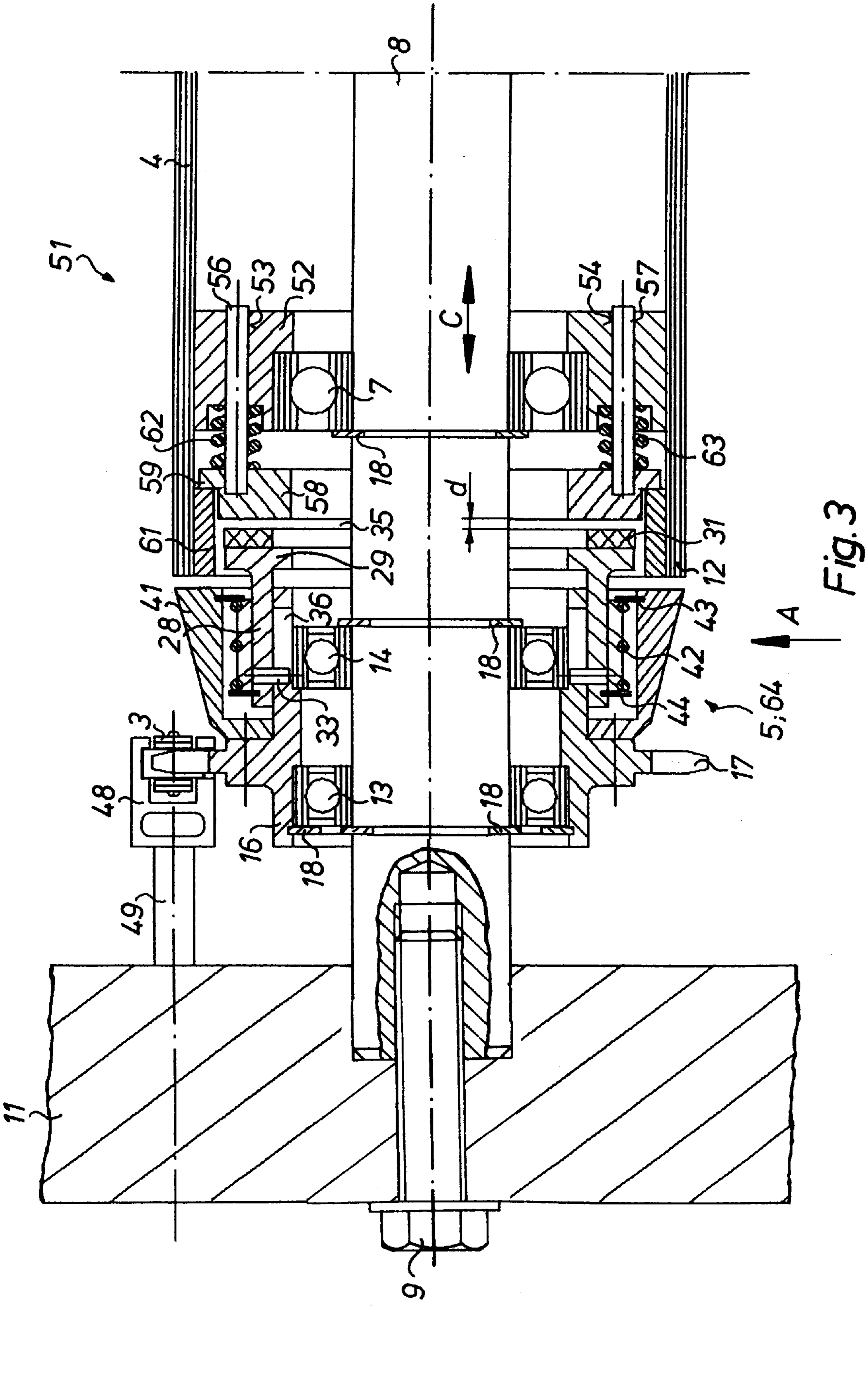

In accordance with a second preferred embodiment as seen in FIG. 3 a guide roller 51 has support rings 52 which support the roller jacket 4 and which are arranged slightly distanced from the ends 12 of the guide rollers 51. Parts which are identical with FIG. 1 have been provided with the same reference numerals.

The support ring 52 has bores 53, 54, which extend in the axial direction of the guide roller 51 and coaxially in respect to the shaft 8, in which guide bolts 56, 57 are slidingly guided in the axis-parallel movement direction C. The ends of the guide bolts 56, 57 projecting out of the bores 53, 54 in the direction toward the end 12 of the guide roller 51 are fastened in a thrust collar 58, which is spaced apart from the support ring 52. The thrust collar 58 rests against a ring-shaped detent 61 located at the end of the guide roller 51 with its outer edge 59. Compression springs 62, 63, which keep the thrust collar 58, which is movable in the axial direction, and the fixed support ring 52 at a mutual distance, are arranged coaxially in respect to each guide bolt 56, 57.

As in the previously mentioned embodiment variation, a helically guided coupling sleeve 28, which has a friction coating 31 on a front flange 29, is arranged with this coupling 5, the centrifugal force coupling 64, on the hub 16 (FIG. 2).

A start-up process of the guide roller 51 takes place in a manner explained in what follows. The flow of force extends via the gear wheel 17 and the hub 16, wherein the coupling sleeve 28 moves helically in the axial direction C and pushes, against the force of the restoring spring 42, with the friction coating 31 against the thrust collar 58 of the guide roller 51. A gap 35 of a gap width d, which extends between the friction coating 31 and the thrust collar 58—as an opposed bearing—, is closed. The guide roller 51 is taken along by frictional connection.

The compression springs 62, 63 arranged between the support ring 52 and the thrust collar 58 are used to limit the torque, so that the centrifugal force coupling 64 exerts a defined pressure force.

As already mentioned, it is furthermore possible to let the friction coating 31 represented in the first preferred embodiment shown in FIG. 1 push against a spring-mounted thrust collar 58 as the torque limiter. This is of particular advantage when the slits 36 to 38 extend at an angle alpha in respect to the radial plane 39 which is greater than zero.

Figure 4:
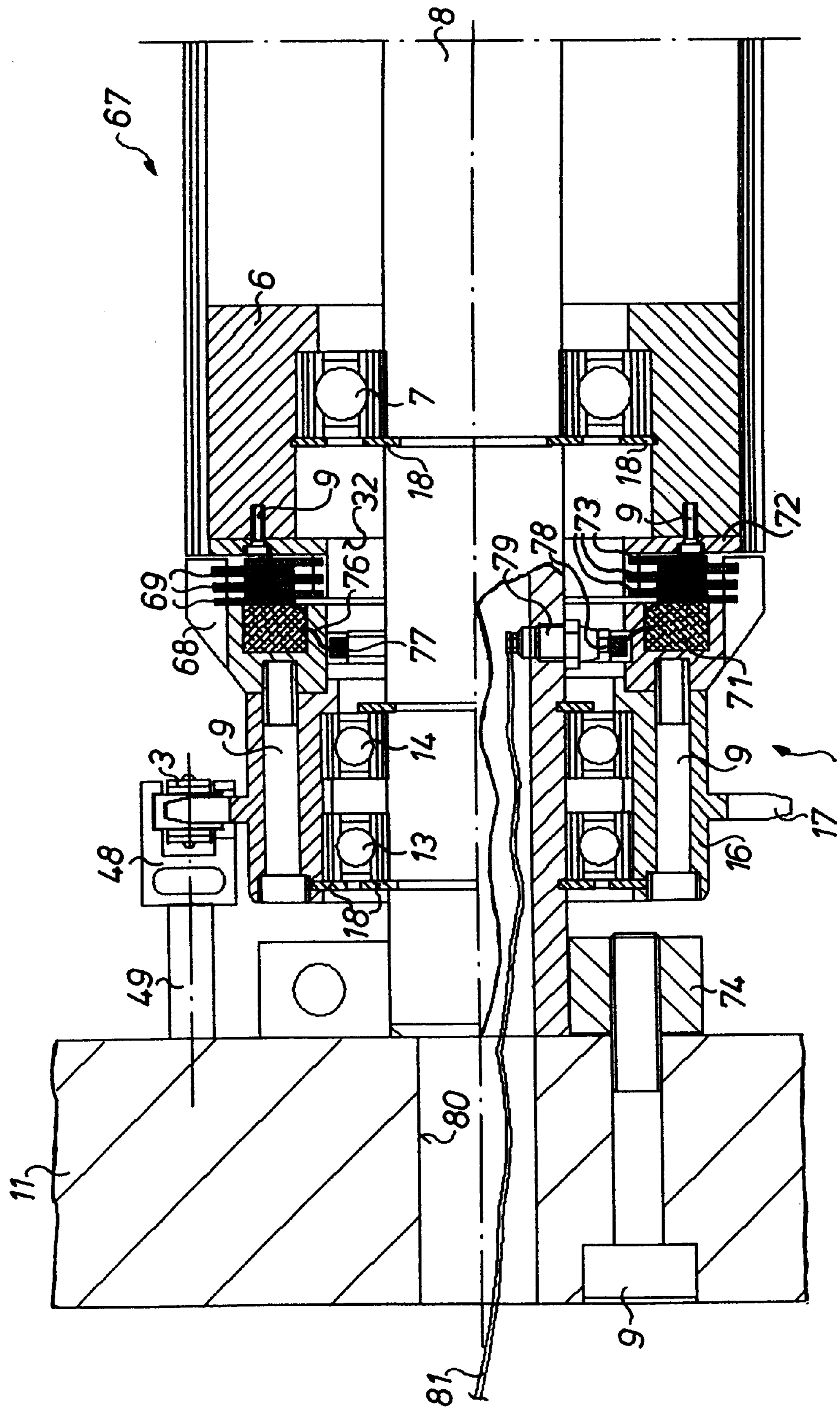

In accordance with a third preferred embodiment as seen in FIG. 4 the coupling 5 consists of a multiple disk coupling 66, which can be acted upon by control means, for example pneumatic cylinders, hydraulic cylinders or magnetic coils.

The multiple disk coupling 66 consists of a hub 16, which is seated on a shaft 8 of the guide roller for the web of material, or respectively paper guide roller, called guide roller 67, and has a fixedly arranged gear wheel 17. The gear wheel 17 meshes with a roller chain 3, which is guided in a chain guide rail 48 maintained on spacers 49. The hub 16 is fixedly connected with a first, left ring-shaped multiple disk support 68, which is located coaxially in respect to the shaft 8 and receives three disk plates 69, which are distanced from each other.

A ring-shaped magnetic coil 71 is located on the side close to the hub of the left multiple disk support 68. On the front 32 of the support ring 6, the guide roller 67 has a second ring-shaped right multiple disk support 72 made of a profiled angle section, which is fixedly connected with the guide roller 67 and also supports three disk plates 73, which are also distanced from each other and again run between the disk plates 69.

The shaft 8 is designed as a hollow shaft, which is held on its end on the lateral frame 11 by means of a clamping ring 74, or respectively is screwed to it. The magnetic coil 71 receives its voltage, for example 12 or 24 Volt, via an electric conductor 76 from a collector ring 77, which is arranged in the multiple disk coupling 66 and is in contact with a carbon brush 78, fixed in place in the hollow shaft. The carbon brush 78 is held by a brush holder 79, which is connected to a voltage source, not represented, via an electric conductor 81 and a bore 80 in the lateral frame 11.

A start-up process of the guide roller 67 takes place in a manner explained in what follows. The start of the roller chain 3, guided in the chain guide rail 48, enters the area of the gear wheel 57 and imparts a rotating movement to it. A sensor, not represented, triggers the actuation of the multiple disk coupling 66 in that the magnetic coil 71 is provided with a voltage via the conductor 76, the collector ring 77, the carbon brush 78, the brush holder 79 and the conductor 81. The guide roller 67 is started up, and when the paper start reaches the area of the guide roller 67 after approximately one half of the chain length, the circumferential speed of the guide roller 67 has reached the draw-in speed of the chain, or respectively of the paper web.

After the end of the roller chain 3 has left the area of the gear wheel 17, the sensor, not represented, switches off the magnetic coil 71 of the multiple disk coupling 66, and the guide roller 67 is now driven by the paper web.

Figure 5:
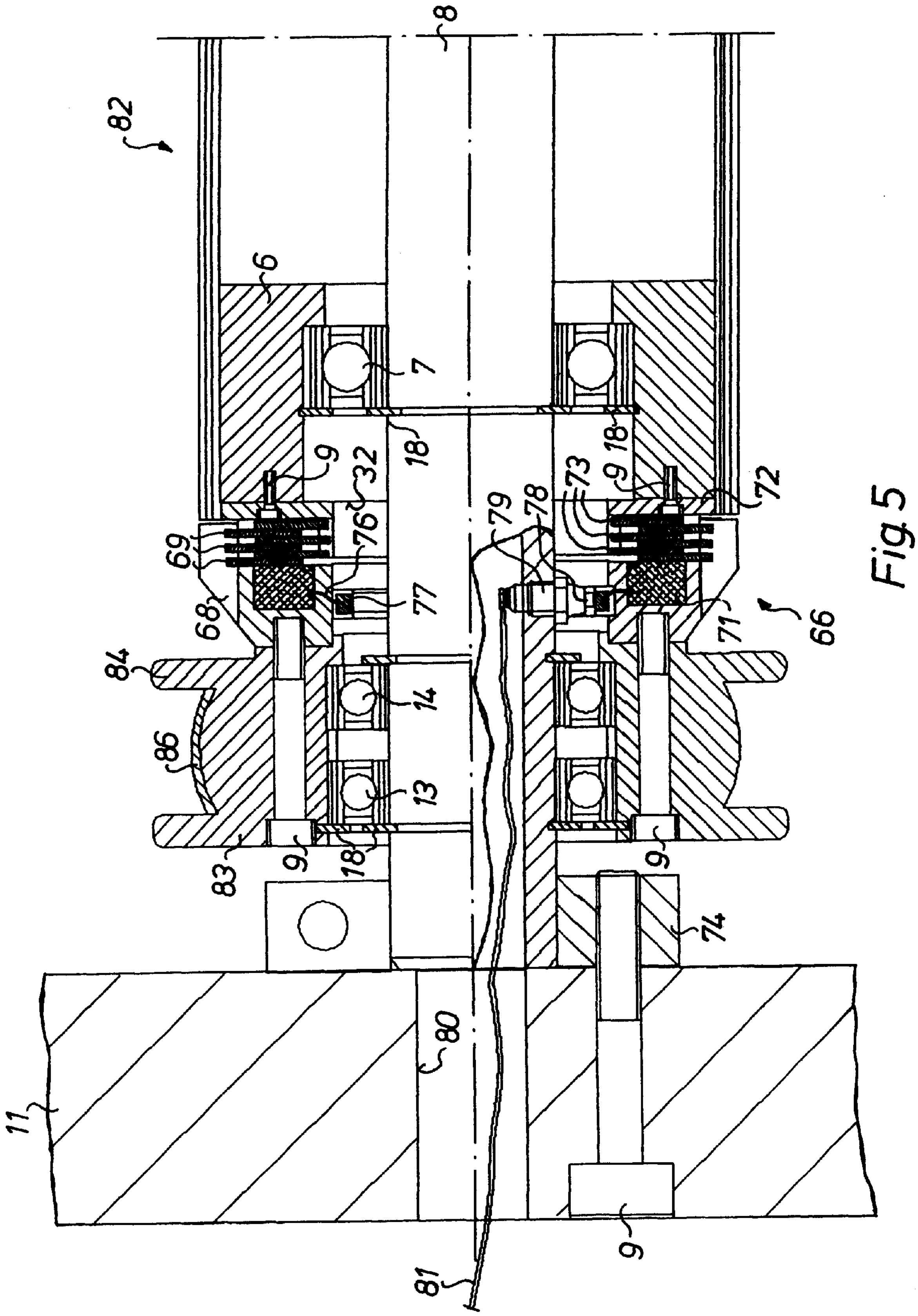

In accordance with a fourth preferred embodiment as seen in FIG. 5, the coupling 5 consists of a multiple disk coupling 66 analogous to that in accordance with FIG. 4, but with the difference that a hub 83, seated on a shaft 8 of a guide roller of a web of material, for example a paper guide roller, called a guide roller 82, is fixedly connected by means of a power take-off disk 84 with the first multiple disk support 68. The power take-of disk 84 supports traction means, for example a draw-in strap 86. The draw-in strap 86 has a metal marking, for example, on a selected spot.

A start-up process of the guide roller 82 takes place in a manner explained in what follows. The traction means, for example the draw-in strap 86, pulled by a drive mechanism, not represented, drives the hub 83 via the power take-off disk 84. When the metal marking on, or respectively in, the draw-in strap 86 comes into the vicinity of the power take-off disk 84, a sensor, not represented, emits a pulse, which acts on the magnetic coil 71 via a timer, and therefore couples the guide roller 82 in. In this way it is assured that at the time of the subsequent arrival of the paper web start, the guide roller 82 has already been brought to the speed of the draw-in strap, or respectively of the paper web.

It is of course also possible to drive a guide roller 1, 51 provided with a centrifugal force coupling 2, 64 by means of strap-shaped profiled traction means 86.

A low-mass guide roller 1, 51, 67, 82 can be produced, for example, in lightweight construction from materials of low weight.

Such a low-mass guide roller 1, 51, 67, 82 can also be employed without the interposition of a coupling 5 between the traction means 3, 86 and the guide rollers 1, 51, 67, 82, provided that the circumferential speed of the guide rollers 1, 51, 67, 82 is equal to (100%) or slightly greater (102 to 105%) than the draw-in speed of the paper web.

A guide roller or a group of guide rollers can also be driven by means of an electric motor.

While preferred embodiments of devices for driving a guide roller in accordance with the present invention have been set forth fully and completely hereinabove, it will be apparent to one of skill in the art that a number of changes in, for example the overall sizes of the guide rollers, the types of material web being guided, and the like can be made without departing from the true spirit and scope of the present invention which is accordingly to be limited by the following claims.

What is claimed is:

1. A device for driving a guide roller for a web of material comprising:

a moving traction means for drawing-in the web of material;

a drive for the guide roller, said traction means being engageable with said guide roller drive during drawing-in of the web of material and;

a centrifugal coupling in said drive for the guide roller, said centrifugal coupling being positioned between said moving traction means and the guide roller.

2. The device of claim 1 wherein said traction means is a finite roller chain.

3. The device of claim 2 wherein said guide roller has a guide roller shaft and further including a gear wheel rotatably supported on said guide roller shaft, said roller chain being interlockingly engageable with said gear wheel.

4. The device in accordance with claim 1, wherein said centrifugal coupling has a hub which is rotatably seated on a shaft of said guide roller and includes a fixedly arranged gear wheel, said hub being fixedly connected with a rotatable centrifugal body carrier containing centrifugal bodies, an actuating path of each of said centrifugal bodies extending in a radial direction of said shaft, each of said centrifugal bodies moving radially outwardly in response to engagement of said moving traction means with said guide roller drive during drawing-in of the web of material, movement of said centrifugal bodies generating a force, said force being transmitted by axial movement of force transmitting members, which are seated on said hub, to a coupling sleeve, which is seated on the hub and which is displaceable in the axial direction against the force of a restoring spring and is fixed against relative rotation, a first end of said coupling sleeve having a friction coating, with which said coupling sleeve can be pressed against a front face of said guide roller, which is rotatably seated on the shaft.

5. The device in accordance with claim 4, wherein said centrifugal bodies which are arranged shiftable in a radial direction in respect to said shaft are wedge-shaped and have wedge faces, said wedge faces of said centrifugal bodies being oriented in a direction facing away from a lateral frame of said device and rising in a direction perpendicular to said shaft.

6. The device in accordance with claim 5, wherein said force transmitting members are studs which are arranged in an axis-parallel direction between said wedge faces of the centrifugal bodies and a first front face of said coupling sleeve.

7. The device in accordance with claim 4, wherein said front face of said guide roller is used as an opposed bearing for said friction coating of said coupling sleeve which can be pressed against it.

8. The device of claim 1 wherein said guide roller is of low mass.

* * * * *